United States Patent Office 3,201,400
Patented Aug. 17, 1965

3,201,400
PROPYLENE OXIDE ADDUCTS OF 1-{2[BIS(2-HY-DROXYPROPYL)AMINO]ETHYL} - 4 - (2 - HY-DROXYPROPYL)-PIPERAZINE
William C. Bedoit, Jr., Houston, Tex., assignor to Jefferson Chemical Company, Inc., Houston, Tex., a corporation of Delaware
No Drawing. Filed July 16, 1962, Ser. No. 210,223
4 Claims. (Cl. 260—268)

This invention relates to novel propylene oxide adducts and to a method for the preparation of such adducts. This invention also relates to a method for the preparation of flexible foam polyurethanes from such products.

In copending Currier et al. application Serial No. 210,222, filed July 16, 1962, and entitled "New Compound and Method for Preparing Polyurethane Therefrom," there is disclosed a method for the preparation of 1-{2[bis(2 - hydroxypropyl)amino]ethyl} - 4-(2-hydroxypropyl)-piperazine, hereinafter referred to as propoxylated N-aminoethylpiperazine.

It has been discovered in accordance with the present invention that good quality propylene oxide adducts of propoxylated N-aminoethylpiperazine in the 400-7000 molecular weight range (calculated from hydroxyl number) can be prepared when, (a) the propoxylated N-aminoethylpiperazine is reacted with propylene oxide under basic reaction conditions to provide a basic crude reaction product, (b) the crude reaction product is neutralized with a theoretical amount of oxalic acid and (c) the crude reaction product is filtered to provide a good quality higher molecular weight propylene oxide adduct. By following this procedure, a low ash product of good color and odor is obtained having the formula:

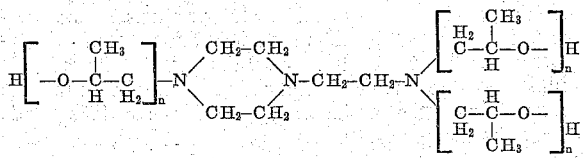

wherein $n$ is a positive integer within the range from 2 to about 40. The thus-prepared propylene oxide adducts of the above formula are useful for a variety of purposes, including the preparation of polyurethanes.

A particularly desirable class of propylene oxide adducts is the class wherein $n$ in the above formula is within the range of about 15 to 25. These adducts can be reacted with an organic isocyanate in the presence of a tertiary amine catalyst stabilizer and a blowing agent to provide excellent quality low density, low odor polyurethane foams having good flex fatigue qualities.

The starting materials for the preparation of the adducts are propylene oxide, propoxylated N-aminoethylpiperazine and an appropriate base, such as alkali metal or alkaline earth metal hydroxide. A preferred base is potassium hydroxide.

A propoxylated adduct is prepared by charging propoxylated N-aminoethylpiperazine and 0.1 to 5 wt. percent of a base such as potassium hydroxide to an appropriate reaction vessel, such as an autoclave provided with an agitator and a vacuum source. After the autoclave has been purged of air (e.g., by vacuum evacuation or purged with an inert gas such as nitrogen), a desired amount of propylene oxide is added to the autoclave batchwise or incrementally under reaction conditions including a pressure of 30 to 60 p.s.i.g. and a temperature of 110° to 150° C. for a period of time within the range of about 0.5 to about 10 hours. Thereafter, the pressure is released and oxalic acid is added in an amount equivalent to the amount of base initally employed. Neutralization is conveniently accomplished at a temperature within the range of about 110° to about 150° C. with agitation over a period of time of about 15 minutes to about two hours, after which the reaction product is filtered to remove insoluble oxalates and to provide a desired product having the formula given above.

If less than an equivalent amount of oxalic acid is employed incomplete neutralization will result, whereas the use of excess oxalic acid will result in the formation of amine oxalate salts which will cause discoloration of the product.

The thus-prepared propylene oxide adducts may be used alone or in admixture with other polyethers or hydroxy terminated polyethers to provide polyurethane foams by reaction with an organic polyisocyanate and water in the presence, if desired, of an appropriate catalyst, such as a teritary amine or a mixture of a tertiary amine with an organotin compound. It is normally desirable to utilize a foam stabilizer, such as a silicone oil.

It has been surprisingly discovered that low odor, low density, flexible polyurethane foams having excellent flex fatigue properties can be prepared when an organic diisocyanate is reacted, in the presence of an appropriate catalyst and foam stabilizing agent, with a member of a preferred class of propylene oxide adducts having the following formula:

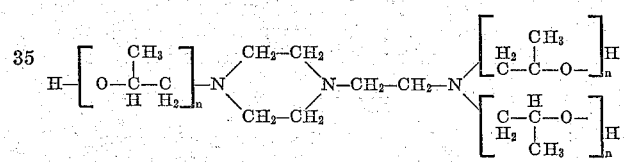

wherein $n$ is a positive integer having a value from about 15 to about 25.

Any suitable organic diisocyanate may be used, such as, for example, trimethylene diisocyanate, hexamethylene diisocyanate, meta-xylylene-1,3-diisocyanate, cyclohexylene-1,4 - diisocyanate, dicyclohexylmethane-4,4'-diisocyanate, meta-phenylene diisocyanate, para-phenylene diisocyanate, 2,4-tolylene diisocyanate, 2,6-tolylene diisocyanate, 2,6 - diethylbenzene-1,4 - diisocyanate, diphenylmethane-4,4'-diisocyanate, 3,3'-dimethoxydiphenylmethane - 4,4'-diisocyanate, naphthalene-1,5-diisocyanate, etc., or mixtures of two or more of such diisocyanates.

The catalytic agent to be employed may suitably comprise a tertiary amine, such as trimethylamine, triethylamine, N-ethylmorpholine, N,N'-dimethylpiperazine, triethylenediamine, pentamethyldiethylenetriamine, etc. The tertiary amine may be used alone or in admixture with a suitable organotin compound, such as dibutyltin dilaurate, stannous octoate, stannous oleate, dibutyltin di-2-ethylhexoate, etc.

The above ingredients are reacted with a triol composition comprising a propylene oxide adduct of the above mentioned formula.

For example, the triol component may consist of a member of the preferred class of propylene oxide adducts of the present invention. Alternatively, from about 5 to about 95 wt. percent of the propylene oxide adduct of the present invention may be replaced with one or a plurality of triols, or with a mixture of diols with triols or tetrol, or both, to provide a mixture having an average functionality of about 3. Thus, the other hydroxyl component may be selected from the group consisting of hydroxy-terminated polyesters and polyoxypropylene ethers of polyhydric alcohols, hydroxy-terminated polyester amides, polythiol ethers, etc., and mixtures thereof. Such triol component should have a molecular weight of at least about 500 and will desirably have a molecular weight within the range of about 1,000 to about 7,000. Best results are obtained with polyols having molecular weights within the range of about 2,000 to about 4,000. Representative examples of such materials include, for example, propylene oxide adducts of polyols, such as ethylene glycol, 1,3-propylene glycol, 1,4-butylene glycol, 1,5-amylene glycol, trimethylol propane, glycerine, pentaethritol, etc., and mixtures thereof. The hydroxy-terminated polyesters may be prepared by the reaction of a suitable dihydric alcohol with carboxylic acid, such as adipic acid, glutaric acid, succinic acid, maleic acid, oxalic acid, phthalic acid sebacic acid, etc., or mixtures thereof.

The foam stabilizer to be utilized in accordance with the present invention may suitably be a silicone such as dimethyl polysiloxone or silicone-polyglycol copolymers, or stabilizers such as polyethoxylated vegetable oils, polyethoxylated phenols, etc.

The blowing agent for use in the preparation of the foam may suitably be any compound, such as water, dichlorodifluoromethane, trifluromethane, etc.

The above named ingredients may be employed in the relative ratio, based on 100 parts of the triol component, of 30 to 40 parts of isocyanate, 0.2 to 0.8 part of tertiary amine (e.g., triethylenediamine), 0 to 0.4 part of organotin compound, 2 to 4 parts of blowing agent (e.g., water) and 0.4 to 2 parts of foam stabilizing agent.

The foam may be produced by a so-called one-shot method employing a suitable mixing apparatus such as that disclosed and described in Hoppe et al. U.S. Patent No. 3,005,624.

The invention will be further illustrated in connection with the following specific examples, which are given by way of illustration and not as limitations on the scope of this invention.

EXAMPLE I

Twenty-six and three tenths pounds of propoxylated N-aminoethylpiperazine and 24 grams of potassium hydroxide were added to a stirred autoclave. Air was removed by flushing the reactor with nitrogen. The mixture was stirred and heated at 110° C. for about 15 minutes, and thereafter propylene oxide was pressured into the kettle until 9.7 pounds of propylene oxide had been added at a temperature of 110° C. and a maximum pressure of 60 p.s.i.g. The product was digested with agitation at 110° C. for an additional two hours. Pressure was then released through a cold trap to condense volatile products and the crude reaction product was neutralized at 110° C. with 27 grams of oxalic acid dihydrate and then vacuum stripped at 120° C. to remove volatile components. The product was filtered and cooled and was found to have the following properties:

Table 1

Hydroxyl number _____ 437
Color, Gardner _____ 5.5
pH (1 wt. percent aqueous solution) _____ 11
Ash, wt. percent _____ Nil

EXAMPLE II

According to the process in Example I, a propylene oxide adduct of propoxylated N-aminoethylpiperazine of 2,850 molecular weight (hydroxyl number 59) was prepared. Charges for the reaction were as follows: propoxylated N-aminoethylpiperazine (6 lb.), potassium hydroxide (96 g.) propylene oxide (62 lb.). The product had the following physical properties:

Hydroxyl No. neg. KOH/g. _____ 59
Water, wt. percent _____ 0.03
Ash, wt. percent _____ Nil
Viscosity, 100° F., cs. _____ 265
Color, Gardner _____ 2–3

EXAMPLE III

In another series of experiments, the same reaction conditions were employed to prepare a series of adducts which were then neutralized with varying quantities of oxalic acid. The neutralization procedure employed and the results obtained are set forth in the following table:

Table 2

ACID REQUIRED FOR NEUTRALIZATION OF AMINO-ETHYLPIPERAZINE-PROPYLENE OXIDE ADDUCTS

[AEP–PrO [1] Adduct, mol. wt. 3,000]

| Sample Number | 1 | 2 | 3 | 4 | 5 | 6 |
|---|---|---|---|---|---|---|
| Potassium hydroxide, g | 5.65 | 5.65 | 5.65 | 5.65 | 5.65 | 5.65 |
| Oxalic acid dihydrate, g | 4.24 | 5.78 | 6.36 | 6.94 | 7.51 | 8.10 |
| Oxalic acid, percent excess | None | None | Theory | 10 | 18 | 28 |
| Oxalic acid-potassium hydroxide, wt. ratio | 0.75 | 1.024 | 1.126 | 1.23 | 1.33 | 1.43 |
| Total ash, wt. percent | 0.010 | 0.0004 | Nil | Nil | Nil | Nil |
| Color, Gardner | 2 | 3 | 5 | 8 | 7 | 8 |
| pH (10 g. in 60 ml. of 10:1 isopropyl alcohol-water) | 11.1 | 9.8 | 9.2 | 9.2 | 9.6 | 9.5 |

[1] AEP = Aminoethylpiperazine; PrO = Propylene oxide.

URETHANE FOAMS BASED UPON PROPYLENE OXIDE ADDUCTS

One-shot urethane foams were prepared from mixtures of oxypropylated glycerine of 3,000 molecular weight and N-aminoethylpiperazine-propylene oxide condensation product of the present invention of 3,000 molecular weight. Both of these products are triols. Foams from the glycerine-propylene oxide condensation product required 0.6% triethylenediamine (based on polyol) as catalyst whereas the foams based on the aminoethylpiperazine-propylene oxide condensation products of the present invention required less than half this amount of catalyst (i.e., 0.26% of triethylenediamine). Example III illustrates the preparation and properties of urethane foams from the aminoethylpiperazine-propylene oxide condensation product of 3,000 molecular weight.

EXAMPLE IV

Urethane foams were prepared from the aminoethyl-piperazine-propylene oxide condensation product of 3,000 molecular weight (hydroxyl number 56.7) using two catalyst concentrations (0.6% and 0.26% based on polyol). The components in parts by weight used to prepare the foams were as follows:

|  | 1 | 2 |
|---|---|---|
| AEP-PrO condensation product of 3,000 molecular weight (hydroxyl number, 56.7) | 200 | 200 |
| Water | 4.95 | 4.95 |
| Silicone oil | 1.19 | 1.19 |
| Triethylenediamine | [1] 1.19 | [2] 0.520 |
| Toluene diisocyanate (commercial products contained 80 percent 2,4 isomer and 20 percent 2,6 isomer) | 73.3 | 73.3 |

[1] 0.6 percent based on polyol.
[2] 0.26 percent based on polyol.

All of the components except the toluene diisocyanate were stirred together for one minute at 2,200 r.p.m. using a Cowles type stirrer. Toluene diisocyanate was added and stirring continued for an additional 5 to 10 seconds. The mixture was poured into a mold. After foam rise was complete, the foams were cured overnight at 73° C. Some properties of the foam are given below:

| Foam No. | Wt. percent Triethylenediamine* | Density, Lb./Ft.³ | Compression Set, 50 at 70° C. for 22 Hrs. |
|---|---|---|---|
| 1 | 0.6 | 2.2 | 4.3 |
| 2 | 0.26 | 2.3 | 8.3 |

*Based on polyol.

| Foam No. | Tear Resistance, Lb./In.² | Compression Deflection | |
|---|---|---|---|
| | | 25% Deflection, Lb./In.² | 50% Deflection, Lb./In.² |
| 1 | 0.81 | 0.47 | 0.60 |
| 2 | 0.04 | 0.44 | 0.56 |

Urethane foams of acceptable quality cannot be prepared from 1-{2[bis(2-hydroxypropyl)amino]ethyl}-4-(2-hydroxypropyl)-piperazine alone due to the high ratio of tertiary amine groups to hydroxyl groups in the adduct. However, as was shown in Example III, stable foams can be prepared from the higher molecular weight propoxylated N-aminoethylpiperazine of the present invention.

Having described my invention, what is claimed is:
1. An adduct having the formula:

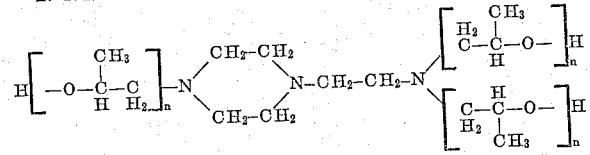

wherein $n$ is an integer within the range from about 2 to about 40.

2. An adduct having the formula:

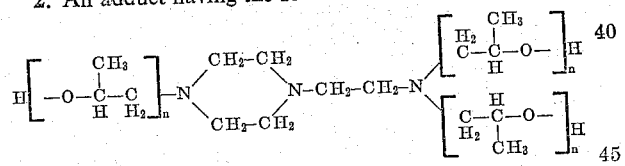

wherein $n$ is an integer within the range from about 15 to about 20.

3. A method which comprises the steps of reacting 1-{2[bis(2-hydroxypropyl)amino]ethyl}-4-(2-hydroxypropyl)-piperazine with from about 6 to about 120 mols of propylene oxide in the presence of a base at a temperature within the range of about 110° to about 150° C. and a pressure within the range of about 40 to about 60 p.s.i.g. to provide a basic crude reaction product, contacting said basic crude reaction product with oxalic acid in an amount equivalent to the amount of said base initially employed, and filtering said neutralized reaction product to obtain a purified propylene oxide adduct of low ash content and odor, said propylene oxide adduct having the formula:

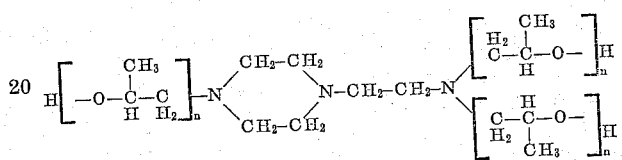

wherein $n$ is a positive integer within the range of about 2 to about 40.

4. A method as in claim 3 wherein the basic crude reaction product is maintained in contact with the oxalic acid within the range of about 100° to about 150° C. for a period of time of about 15 minutes to about two hours to obtain neutralization.

References Cited by the Examiner
UNITED STATES PATENTS

| | | | |
|---|---|---|---|
| 2,949,431 | 8/60 | Britain | 260—2.5 |
| 2,995,530 | 8/61 | Frisch et al. | 260—2.5 |
| 3,037,983 | 6/62 | Geschickter et al. | 260—268 |
| 3,055,901 | 9/62 | Speranza et al. | 260—268 |

NICHOLAS S. RIZZO, *Primary Examiner.*

LEON J. BERCOVITZ, *Examiner.*